United States Patent
Lang et al.

(10) Patent No.: US 10,894,566 B2
(45) Date of Patent: Jan. 19, 2021

(54) ARRANGEMENT FOR CONNECTING TWO VEHICLE BODY COMPONENTS AND METHOD FOR PRODUCING A SHEET METAL COMPONENT HAVING A DOUBLED JOINING FLANGE

(71) Applicant: Bayerische Motoren Werke Aktiengesellschaft, Munich (DE)

(72) Inventors: Martin Lang, Seeshaupt (DE); Thomas Wimmer, Eching (DE); Werner Lindner, Sulzemoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/896,552

(22) Filed: Feb. 14, 2018

(65) Prior Publication Data
US 2018/0170448 A1  Jun. 21, 2018

Related U.S. Application Data

(63) Continuation of application No. PCT/EP2016/072889, filed on Sep. 27, 2016.

(30) Foreign Application Priority Data

Oct. 12, 2015 (DE) .......................... 10 2015 219 694

(51) Int. Cl.
*B62D 25/20* (2006.01)
*B62D 27/02* (2006.01)
(Continued)

(52) U.S. Cl.
CPC ......... *B62D 25/2036* (2013.01); *B21D 5/042* (2013.01); *B21D 19/043* (2013.01);
(Continued)

(58) Field of Classification Search
CPC .. B62D 25/025; B62D 27/02; B62D 25/2036; F16B 5/08
(Continued)

(56) References Cited

U.S. PATENT DOCUMENTS 2,250,617 A * 7/1941 Argentin ................. B23K 11/11
219/91.2
2,782,495 A   2/1957 Beck et al.
(Continued)

FOREIGN PATENT DOCUMENTS

CN    1835815 A    9/2006
DE    32 15 616 A1  11/1983
(Continued)

OTHER PUBLICATIONS

German Search Report issued in counterpart German Application No. 10 2015 219 694.1 dated Jun. 14, 2016 with partial English-language translation (Eleven (11) pages).
(Continued)

*Primary Examiner* — Dennis H Pedder
(74) *Attorney, Agent, or Firm* — Crowell & Moring LLP

(57) ABSTRACT

An arrangement for connecting different parts includes two vehicle components. The vehicle body components include a first vehicle body component taking the form of a sheet metal component with a joining flange and being connected at this joining flange to the second vehicle body component via a welded connection. The joining flange on the first vehicle body component has a turned-over rim and is thereby formed with a doubled sheet metal thickness.

4 Claims, 3 Drawing Sheets

(51) Int. Cl.
*B21D 5/04* (2006.01)
*B21D 19/04* (2006.01)
*B62D 25/02* (2006.01)
*F16B 5/08* (2006.01)

(52) U.S. Cl.
CPC ........... *B62D 25/025* (2013.01); *B62D 27/02* (2013.01); *F16B 5/08* (2013.01)

(58) Field of Classification Search
USPC .............................................. 296/29, 30, 209
See application file for complete search history.

(56) References Cited

U.S. PATENT DOCUMENTS

| | | | | |
|---|---|---|---|---|
| 2,813,497 | A * | 11/1957 | Jaeckle | B61D 5/002 105/424 |
| 4,187,407 | A | 2/1980 | Marko, Jr. | |
| 4,470,717 | A * | 9/1984 | Bruhnke | B23K 33/008 219/91.2 |
| 4,559,274 | A | 12/1985 | Kloppe et al. | |
| 4,738,560 | A | 4/1988 | Bruessow et al. | |
| 5,487,803 | A | 1/1996 | Sweeney et al. | |
| 8,894,136 | B2 * | 11/2014 | Shono | B62D 25/06 296/203.03 |
| 2005/0189791 | A1 * | 9/2005 | Chernoff | B62D 25/20 296/193.07 |
| 2006/0043774 | A1 | 3/2006 | McNulty et al. | |
| 2006/0249969 | A1 | 11/2006 | Grueneklee et al. | |
| 2008/0188176 | A1 * | 8/2008 | Hunt | E04D 13/17 454/366 |
| 2011/0254320 | A1 * | 10/2011 | Mori | B62D 25/02 296/209 |
| 2015/0145288 | A1 | 5/2015 | Kellner | |
| 2015/0273620 | A1 * | 10/2015 | Sakamoto | B23K 11/20 403/179 |

FOREIGN PATENT DOCUMENTS

| | | |
|---|---|---|
| DE | 35 15 598 A1 | 11/1986 |
| DE | 198 35 992 A1 | 2/2000 |
| DE | 10 2010 004 283 A1 | 7/2011 |
| DE | 10 2010 006 553 A1 | 8/2011 |
| DE | 10 2010 062 748 A1 | 6/2012 |
| DE | 10 2013 113 164 A1 | 5/2015 |
| DE | 10 2014 200 598 B3 | 5/2015 |
| EP | 0 177 945 A1 | 4/1986 |
| GB | 269428 * | 4/1927 |

OTHER PUBLICATIONS

International Search Report (PCT/ISA/210) issued in PCT Application No. PCT/EP2016/072889 dated Jan. 25, 2017 with English-language translation (Five (5) pages).
English translation of Chinese Office Action issued in counterpart Chinese Application No. 201680034981.9 dated Jan. 23, 2019 (eight pages).

* cited by examiner

ARRANGEMENT FOR CONNECTING TWO VEHICLE BODY COMPONENTS AND METHOD FOR PRODUCING A SHEET METAL COMPONENT HAVING A DOUBLED JOINING FLANGE

CROSS REFERENCE TO RELATED APPLICATIONS

This application is a continuation of PCT International Application No. PCT/EP2016/072889, filed Sep. 27, 2016, which claims priority under 35 U.S.C. § 119 from German Patent Application No. 10 2015 219 694.1, filed Oct. 12, 2015, the entire disclosures of which are herein expressly incorporated by reference.

BACKGROUND AND SUMMARY OF THE INVENTION

The embodiments of the invention relate to an arrangement for connecting two vehicle body components in which one vehicle body component or the first vehicle body component takes the form of a sheet metal component with a joining flange and is connected at this joining flange to the other vehicle body component or the second vehicle body component by means of a welded connection.

The embodiments of the invention further relate to a method for producing a sheet metal component formed with a joining flange.

DE 10 2013 113 164 A1 describes a sill assembly having a sill inner part which is connected to a floor panel. The floor panel is formed with a joining flange. DE 10 2014 200 598 B3 describes a sill which is attached to a floor assembly. The floor assembly is formed with a joining flange.

The floor panel or the floor assembly is typically joined at its joining flange by means of a welded connection. Under load and in particular in the event of a crash, high forces have to be transferred via this welded connection. This can be achieved for example by suitable laser seam tracking, thick floor panels and/or high-strength floor panel materials. However, these measures are cost-intensive and/or associated with excess weight.

One object of the invention is to provide a connection arrangement of the type in question which can be produced economically without significant excess weight.

This and other objects are achieved by the inventive connection arrangement disclosed herein. Also presented herein is an inventive method for producing a sheet metal component which is furthermore suitable for use in a or for the production of a connection arrangement according to the embodiments of the invention. Preferred developments and refinements of the invention will emerge analogously for both subjects of the invention, as discussed in the following description and the figures.

The inventive connection arrangement is distinguished by the fact that the joining flange has a turned-over rim on the first vehicle body component formed as a sheet metal component and thus has a doubled sheet metal thickness, at least in the region of the welded connection. Such a joining flange can also be referred to as a doubled joining flange.

By virtue of the turned-over rim, the first vehicle body component of the inventive connection arrangement locally has a doubled sheet metal thickness at its joining flange and can thus take up or transfer high forces along the welded connection. The welded connection preferably penetrates through the two sheet metal layers of the joining flange which lie on one another with the result that, on the one hand, the welded connection is particularly loadable and, on the other hand, the two sheet metal layers are held together in an integrally bonded manner. Furthermore, advantages are obtained during the production of the welded connection, for example through an improved heat dissipation. A high loadability is thus ensured in the region of the welded connection. Under certain circumstances, the inventive vehicle body component or sheet metal component can therefore be produced from a comparatively thin and/or low-strength or soft (and thus readily formable) sheet metal material, which is advantageous in terms of weight and economical producibility.

The welded connection is preferably a spot-welded connection having a plurality of welding points which are arranged in particular in a distributed manner along the doubled joining flange. The welding points preferably penetrate through both sheet metal layers of the joining flange which lie on one another, as already explained above. Particularly in comparison to seam welding, spot welding is a quick and cost-effective joining method. Moreover, better localized accessibility to the welding location is frequently provided. The doubled sheet metal thickness at the joining flange of the first vehicle body component means that the welding points, in particular in the event of a crash, can transfer high forces. Furthermore, "popping out" of the welding points is made more difficult by the doubled sheet metal thickness in the joining flange.

The first vehicle body component or sheet metal component preferably has a substantially uniform or homogeneous sheet metal thickness of not more than 1.2 mm, preferably of not more than 1.0 mm and in particular of not more than 0.8 mm. What is meant by "substantially" here is that low sheet metal thickness fluctuations can be present on account of this sheet metal component being produced by forming. Accordingly, the joining flange has a doubled thickness (i.e. 2.4 mm, 2.0 mm or 1.6 mm). The sheet metal material is in particular a steel sheet. There is preferably also provision that the first vehicle body component or its sheet metal material has a substantially homogeneous strength or hardness. What is meant by "substantially" here is that locally different strengths can be present as a result of this sheet metal component being produced by forming. The sheet metal material is preferably not, even locally, hardened (for example press-hardened) and is thus unhardened.

The first vehicle body component is preferably produced in one piece from a sheet metal material, i.e. from a single piece of sheet metal, in particular by forming a monolithic sheet metal blank. What is meant in particular by this is that the first vehicle body component is not produced from a so-called tailored welded blank.

The joining flange on the first vehicle body component that is formed by the turned-over rim preferably has a width of 20 mm to 50 mm and in particular from 30 mm to 40 mm.

The welded connection, i.e. the welding seam or the welding points, is preferably formed as close as possible to the bending edge (folding edge) of the turned-over rim. What is meant in particular by this is that the welded connection is at a distance of not more than 10 mm, preferably not more than 7.5 mm, from the bending edge of the turned-over rim on the first vehicle body component. During welding, and in particular during spot welding by means of electrodes, the sheet metal layers lying on one another in the joining flange are repeatedly pressed together along the bending edge, which promotes the final formation of a small edge radius on the bending edge.

The turned-over rim is preferably turned over inwardly on the first vehicle body component. The cut edge or the cut rim is thus protected from external corrosive effects, with the result that no further measures are required as a rule for protecting the cut edge from edge corrosion.

The sheet metal layers lying on one another in the joining flange of the first vehicle body component can additionally be adhesively bonded to one another. For this purpose, use can be made, for example, of a heat-curing adhesive which then cures, for example, during a cathodic electrode deposition process.

The first vehicle body component is preferably a floor panel and the other or the second vehicle body component is a sill (side sill) or a sill component. The sill can be formed from a plurality of individual parts, in particular sheet metal components. The floor panel is in particular a three-dimensionally shaped sheet metal formed part which is produced for example using the inventive method.

The inventive method for producing a sheet metal component or sheet metal formed part with at least one joining flange which has a turned-over rim and is thereby formed with a doubled sheet metal thickness is distinguished by the fact that the sheet metal component is produced completely, i.e. ready for installation or joining, in a press line (or multi-stage press or the like) starting from a planar blank (or a sheet metal strip). The sheet metal workpiece passes through the individual stages of the press line and in so doing is formed progressively to give a three-dimensionally shaped vehicle body sheet metal component, in particular a floor panel, with a correspondingly formed joining flange. Specifically, the steps in question here are the following: forming, cutting, doubling up the joining flange by setting up and bending over the rim, postforming and final cutting. The bending-over of the rim, which is set up beforehand, is preferably carried out by means of at least one rotary slide which is integrated in the relevant press tool and which, when closing this press tool, bends over or folds over the set-up rim with the smallest possible bending radius such that it resembles a turnover.

This sheet metal component or sheet metal formed part can be produced directly at an OEM or else at a supplier's. The produced sheet metal formed part can then be joined to another vehicle body component at its doubled-up joining flange.

Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figure 1:
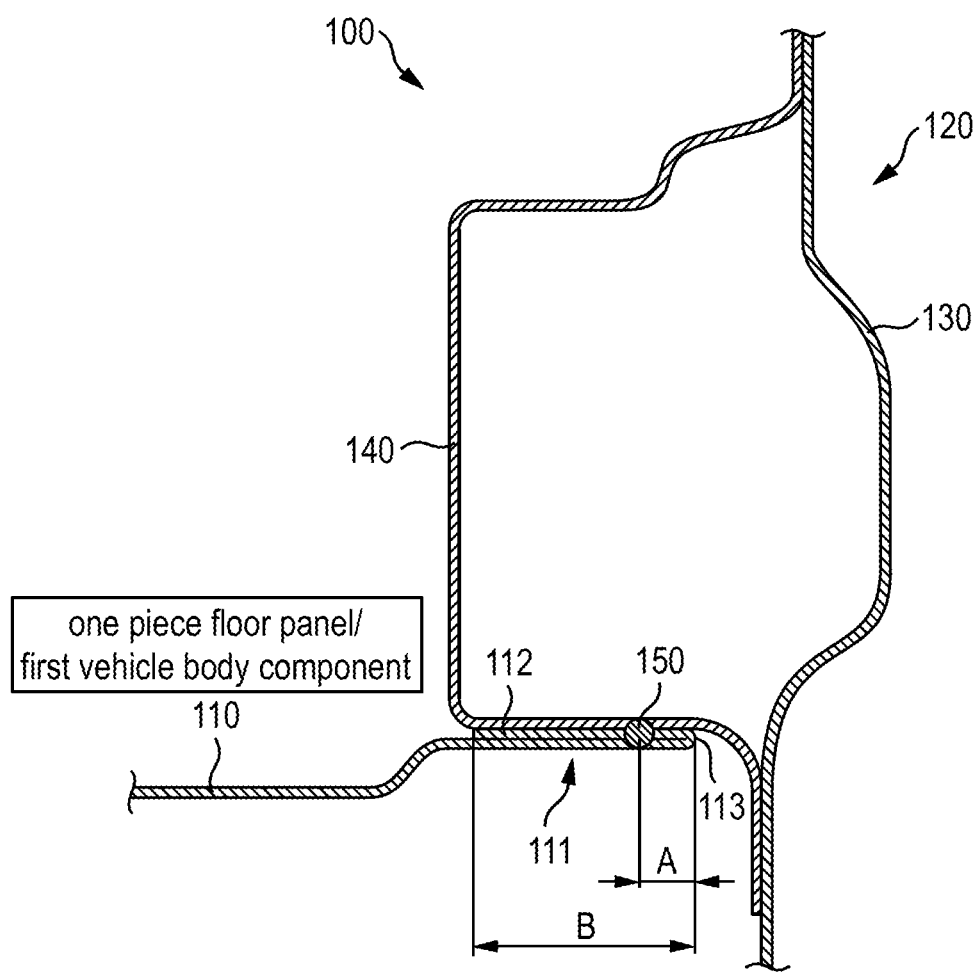
FIG. 1 shows, in a sectional view, a component assembly consisting of a plurality of vehicle body components having an inventive connection arrangement.

FIG. 1 shows a component assembly 100 between a floor panel 110 and a sill 120. The sill 120 is formed from an outer part 130 and an inner reinforcing part 140. All the vehicle body components 110, 130 and 140 are sheet metal components and in particular sheet metal formed parts. The inner reinforcing part 140 (second vehicle body component) and the floor panel 110 (first vehicle body component) attached thereto form an inventive connection arrangement. The floor panel 110 has a joining flange 111 at which it is connected to the inner reinforcing part 140 by means of spot-welded connections 150.

The joining flange 111 on the floor panel 110 may have a turned-over rim 112, or a rim 112 folded over through 180°, and thus the joining flange 111 is formed with a doubled sheet metal thickness. The floor panel 110 is formed for example from a sheet metal material (steel sheet) with a sheet metal thickness of 0.8 mm or 1.2 mm, with the result that the joining flange 111 has a thickness of 1.6 mm or 2.4 mm. By virtue of the doubled sheet metal thickness created on the joining flange 111, the welding points 150, in spite of the originally thin sheet metal material, can transfer high forces without this being associated with significant excess weight. Under certain circumstances, a weight saving can even be achieved by comparison with other solutions (such as, for example, when using a welded tailored blank in which a low-strength but readily formable steel sheet is used for the floor region and a high-strength steel sheet, possibly with an additionally higher sheet metal thickness, is used for the joining flange).

The joining flange 111 formed by the inwardly turned-over rim 112 has a width or depth B of for example 30 mm to 40 mm. The rim 112 which is turned over inwardly or in the direction of the inner reinforcing part 140 is situated as it were in a joining zone between the joined components 110 and 140 and is thus maintained in shape and position. In particular, the joining flange 111 is thus also prevented from unfolding. The welding points 150 have a spacing A of not more than 10 mm from the bending or folding edge 113. Moreover, the floor panel 110 can have a plurality of joining flanges formed in this way.

Figure 2A:
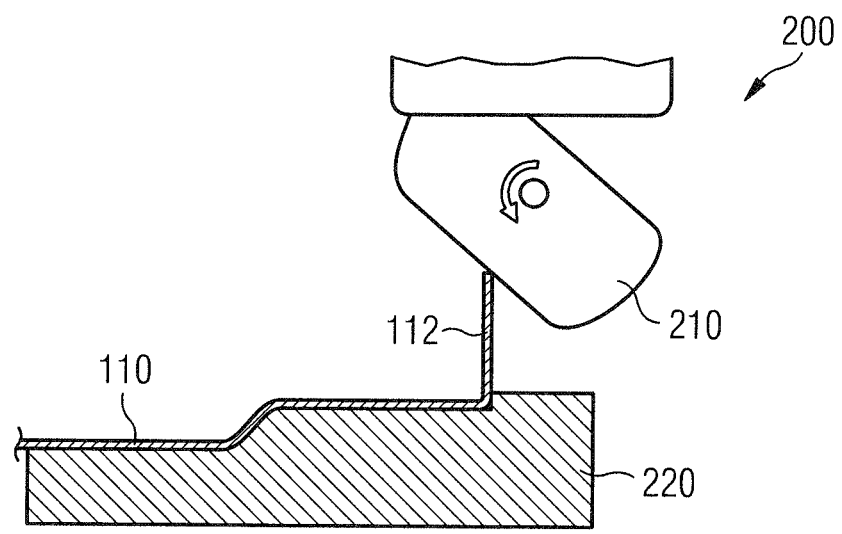
FIGS. 2A-C show, in a plurality of sectional illustrations, the production of a joining flange on a vehicle body component belonging to the component assembly of FIG. 1.
Figure 2B:
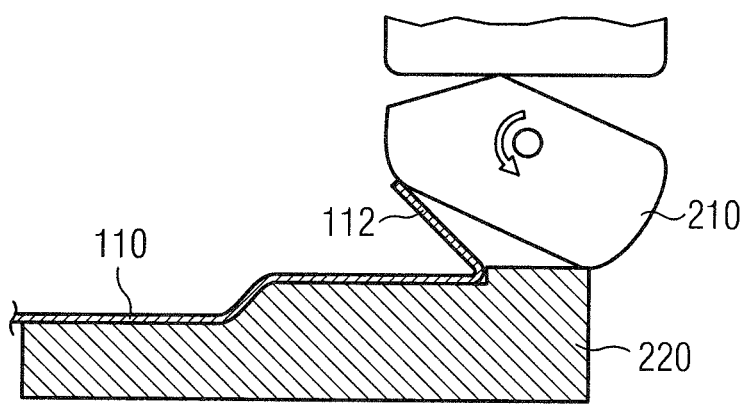
Figure 2C:
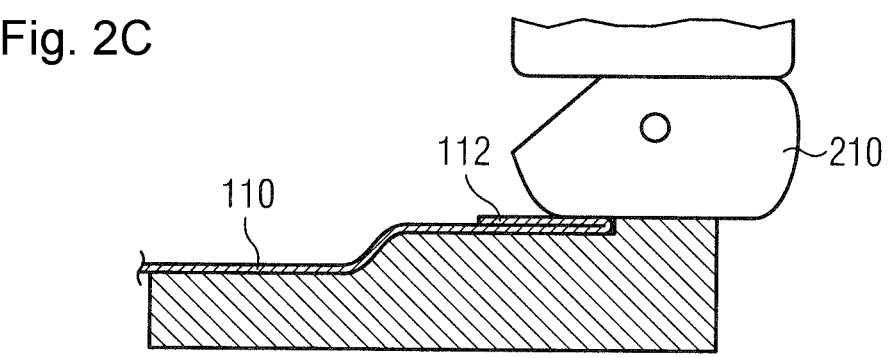

The floor panel 110, which has a three-dimensional shaping, is produced completely in a press line or the like starting from a planar steel sheet blank. Here, the rim 112 to be turned over is first setup or straightened up and then folded over. The folding-over operation takes place in a press tool 200 which is formed for this purpose with at least one rotary slide 210 arranged in the tool upper part (or, where appropriate, also in the tool lower part). The sequence is illustrated in FIGS. 2A, 2B and 2C. The turnover is produced within a press stroke with the smallest possible edge radius or bending radius on the bending edge 113. A workpiece support belonging to the tool lower part is designated by 220. Forming and/or cutting operations can be carried out simultaneously in the press tool 200.

Figure 3:
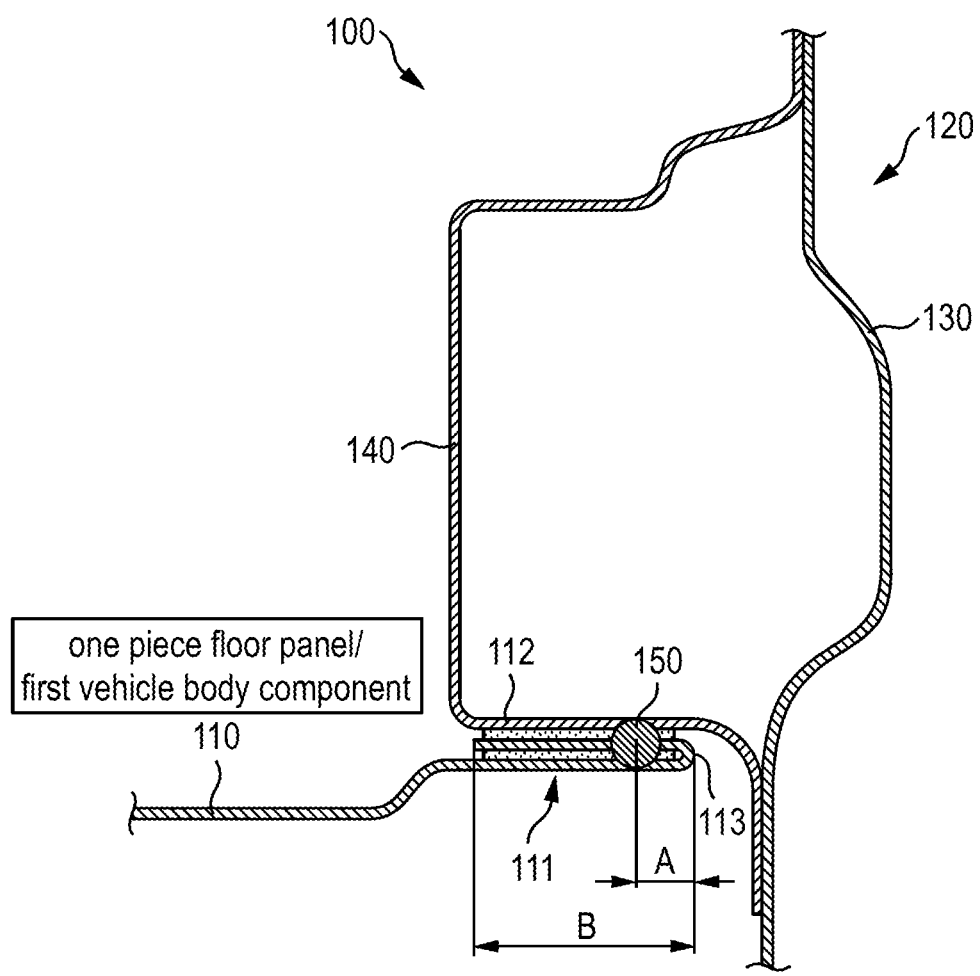
FIG. 3 shows, in another sectional view, a component assembly consisting of a plurality of vehicle body components having an inventive connection arrangement.

As shown in FIG. 3, the sheet metal layers (140 and 110) lying on one another in the joining flange 111 of the first vehicle body component are additionally adhesively bonded to one another.

LIST OF REFERENCE SIGNS

100 Component assembly
110 Floor panel
111 Joining flange
112 Rim
113 Bending edge
120 Sill
130 Outer part
140 Inner reinforcing part
150 Welding point(s)
200 Press tool
210 Rotary slide 220 Workpiece support
A Spacing
Width The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for connecting different parts, the arrangement comprising:
    two vehicle body components, the first vehicle body component taking the form of a sheet metal component with a joining flange and being connected at this joining flange to the second vehicle body component via a welded connection, wherein
        the joining flange on the first vehicle body component has a turned-over rim and is thereby formed with a doubled sheet metal thickness,
        the welded connection is a spot-welded connection having a plurality of spot welds that penetrate through the thickness of: i) the turned-over rim, and ii) the second vehicle body component,
        the first vehicle body component has a substantially uniform sheet metal thickness that ranges from not more than 1.2 mm to not more than 0.8 mm,
        the first vehicle body component is produced in one piece,
        the joining flange formed by the turned-over rim on the first vehicle body component has a width that ranges from 20 mm to 50 mm,
        the welded connection is formed at a distance of not more than 10 mm from a bending edge of the turned-over rim on the first vehicle body component, and
        the rim is turned over inwardly on the first vehicle body component.

2. The arrangement as claimed in claim 1, wherein the sheet metal layers lying on one another in the joining flange of the first vehicle body component are additionally adhesively bonded to one another.

3. The arrangement as claimed in claim 2, wherein the first vehicle body component is a floor panel and the second vehicle body component is a sill.

4. An arrangement for connecting different parts, the arrangement comprising:
    a vehicle floor panel; and
    a reinforcing sill, the vehicle floor panel taking the form of a sheet metal component with a joining flange and being connected at this joining flange to the reinforcing sill via a welded connection, wherein
        the joining flange on the vehicle floor panel has a turned-over rim and is thereby formed with a doubled sheet metal thickness,
        the welded connection is a spot-welded connection having a plurality of spot welds that penetrate through the thickness of: i) the turned-over rim, and ii) the reinforcing sill,
        the vehicle floor panel has a substantially uniform sheet metal thickness that ranges from not more than 1.2 mm to not more than 0.8 mm,
        the vehicle floor panel is produced in one piece,
        the joining flange formed by the turned-over rim on the vehicle floor panel has a width that ranges from 20 mm to 50 mm,
        the welded connection is formed at a distance of not more than 10 mm from a bending edge of the turned-over rim on the vehicle floor panel, and
        the rim is turned over inwardly on the vehicle floor panel.

* * * * *